United States Patent
Zhao

(10) Patent No.: US 11,472,919 B2
(45) Date of Patent: Oct. 18, 2022

(54) ALKOXYLATED ALKYL AMINE POLYESTERS AS POUR POINT DEPRESSANTS FOR FUELS

(71) Applicant: Huntsman Petrochemical LLC, The Woodlands, TX (US)

(72) Inventor: Haibo Zhao, The Woodlands, TX (US)

(73) Assignee: Huntsman Petrochemical LLC, The Woodlands, TX (US)

(*) Notice: Subject to any disclaimer, the term of this patent is extended or adjusted under 35 U.S.C. 154(b) by 14 days.

(21) Appl. No.: 15/733,927

(22) PCT Filed: Jun. 6, 2019

(86) PCT No.: PCT/US2019/035685
§ 371 (c)(1),
(2) Date: Dec. 1, 2020

(87) PCT Pub. No.: WO2019/236779
PCT Pub. Date: Dec. 12, 2019

(65) Prior Publication Data
US 2021/0221949 A1    Jul. 22, 2021

Related U.S. Application Data

(60) Provisional application No. 62/682,195, filed on Jun. 8, 2018.

(51) Int. Cl.
| | |
|---|---|
| *C08G 63/685* | (2006.01) |
| *C10L 1/238* | (2006.01) |
| *C10L 10/16* | (2006.01) |

(52) U.S. Cl.
CPC .......... *C08G 63/6856* (2013.01); *C10L 1/238* (2013.01); *C10L 10/16* (2013.01)

(58) Field of Classification Search
CPC ............. C08G 63/6856; C08G 63/553; C08G 63/672; C08G 65/2624; C08G 65/3322; C10L 1/238; C10L 10/16; C10L 2200/0446; C10L 1/2225; C10L 1/2387; C10L 10/14; C10L 1/2381
See application file for complete search history.

(56) References Cited

U.S. PATENT DOCUMENTS

| | | | |
|---|---|---|---|
| 3,982,909 A | 9/1976 | Hollyday, Jr. | |
| 4,391,610 A | 7/1983 | Sung et al. | |
| 4,734,523 A * | 3/1988 | Hofinger | C08G 63/6856 560/182 |
| 4,885,110 A * | 12/1989 | Bose | C08G 63/685 516/179 |
| 5,421,993 A | 6/1995 | Hille et al. | |
| 6,060,625 A | 5/2000 | Su et al. | |
| 8,034,979 B2 | 10/2011 | Zhu et al. | |
| 9,587,188 B2 | 3/2017 | Sharko et al. | |
| 9,919,498 B2 | 3/2018 | Jokisch et al. | |
| 2010/0203331 A1* | 8/2010 | van der Woude | C08K 7/14 428/375 |

FOREIGN PATENT DOCUMENTS

WO    WO-2017141117 A1 *    8/2017   ............. B03D 1/011

OTHER PUBLICATIONS

International Search Report and Written Opinion received in corresponding PCT Application PCT/US2019/035685 completed Jul. 18, 2019 and dated Aug. 16, 2019.

* cited by examiner

*Primary Examiner* — Pamela H Weiss
(74) *Attorney, Agent, or Firm* — Huntsman Petrochemical LLC; Aleece M. Hayes

(57) ABSTRACT

The present disclosure provides a pour point dispersant composition comprising an alkoxylated alkyl amine polyester. The pour point depressant composition may optionally be combined with a solvent and added to a hydrocarbon composition to improve the cold-flow properties of the hydrocarbon composition.

15 Claims, No Drawings

US 11,472,919 B2

ALKOXYLATED ALKYL AMINE POLYESTERS AS POUR POINT DEPRESSANTS FOR FUELS

CROSS-REFERENCE TO RELATED APPLICATIONS

This application is the National Phase of International Application No. PCT/US2019/035685 filed Jun. 6, 2019 which designated the U.S. and which claims priority to U.S. Provisional Patent Application Ser. No. 62/682,195, filed Jun. 8, 2018. The noted applications are incorporated herein by reference.

STATEMENT REGARDING FEDERALLY SPONSORED RESEARCH OR DEVELOPMENT

Not applicable.

FIELD

The present disclosure generally relates to pour point depressants for use in improving the cold-flow properties of various oils, such as crude oils, distillate oils, fuel oils and lubricating oils. In particular, the pour point depressants of the present disclosure comprise an alkoxylated alkyl amine polyester.

BACKGROUND

Fuel oils, such as gasoline, diesel oil or heating oil, and middle distillates obtained by the distillation of such fuel oils contain, depending on the origin of the fuel oil, various amounts of n-paraffins. When the temperature of the fuel oil or middle distillate is reduced below its pour point, the n-paraffins can crystallize out as platelet-shaped crystals, and in some cases agglomerate with inclusion of oil. Such crystallization and agglomeration can cause an impairment of the flow properties of these oils or distillates resulting in problems during their recovery, transport, storage and/or use. For instance, in the case of fuel oils, this crystallization phenomenon can cause deposits to form on the walls of pipelines, valves and pumps during transportation which can lead to complete blockage thereof. Precipitation of n-paraffins can also cause problems during storage and further processing of the oils and in some circumstances, such as during winter, it may be necessary to store the fuel oils in heated tanks. In the case of distillates, crystallization can result in blockage of the filters in diesel engines and furnaces preventing reliable metering of the fuels, and in some cases, cause complete interruption of the supply of fuel or heating medium.

The problems described above are well recognized in the art and various additives have been proposed, many of which are in commercial use, for improving the low temperature flow properties of fuel oils and distillates. For example:

U.S. Pat. No. 3,048,479 teaches the use of copolymers of ethylene and $C_3$-$C_5$ vinyl esters, such as vinyl acetate, as pour point depressants for middle distillates and lighter fuels;

U.S. Pat. No. 3,252,771 discloses polymerization products of normal alpha-olefins having 16 to 18 carbon atoms and their use to depress the pour point of hydrocarbon fuels;

U.S. Pat. No. 3,961,916 teaches the use of a mixture of copolymers of ethylene and an unsaturated ester monomer to control the size of the wax crystals in middle distillates;

U.S. Pat. Nos. 3,982,909, 4,211,534 and 4,402,708 teach the use of certain nitrogen containing compounds as pour point depressants;

U.S. Pat. No. 5,421,993 discloses oxyalkylated fatty amines and fatty amine derivatives having a particular structure and their use as pour point depressants for crude oils;

More recently, U.S. Pat. No. 8,481,632 teaches dendrimeric hyperbranched polyester amides obtained from the reaction of a cyclic anhydride and an alkanolamine and their use in methods for improving the flowability of a mixture containing wax and other hydrocarbons; and U.S. Pat. No. 9,587,188 discloses a pour point depressant comprising the reaction product of a branched primary alcohol having 8 to 28 carbon atoms and an acid.

In spite of the various known additives for improving the low temperature flow properties of fuel oils and distillates, there exists a continual need in the art for new additives that are highly effective and which can be used in low concentrations.

SUMMARY

The present disclosure provides a pour point depressant composition comprising an alkoxylated alkyl amine polyester. In one embodiment, the alkoxylated alkyl amine polyester can be obtained from the reaction of a polycarboxylic acid and an alkoxylated alkyl amine.

The present disclosure also provides a pour point depressant concentrate comprising the pour point depressant composition of the present disclosure and a solvent. In one particular embodiment, the solvent is a hydrocarbon.

The present disclosure also provides a composition comprising a hydrocarbon composition and the pour point depressant composition or concentrate of the present disclosure.

Finally, the present disclosure provides methods of decreasing a pour point of and/or decreasing average wax particle size in a hydrocarbon composition comprising combining the hydrocarbon composition and the pour point depressant composition.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "an amine" means one amine or more than one amine. The phrases "in one aspect", "according to one aspect" and the like generally mean the particular feature, structure, or characteristic following the phrase is included in at least one embodiment of the present disclosure, and may be included in more than one embodiment of the present disclosure. Importantly, such phrases do not necessarily refer to the same embodiment. If the specification states a component or feature "may", "can", "could", or "might" be included or have a characteristic, that particular component or feature is not required to be included or have the characteristic.

Where substituent groups are specified by their conventional chemical formulae, written from left to right, they equally encompass the chemically identical substituents that would result from writing the structure from right to left, for example, —CH$_2$O— is equivalent to —OCH$_2$—.

The term "hydrocarbon composition" refers to a composition comprising at least one liquid hydrocarbon compound. The hydrocarbon composition can include a composition having compounds comprising only hydrogen and carbon and compounds comprising other elements in addition to hydrogen and carbon. Thus, the term "hydrocarbon composition" is not intended to describe compositions comprising only hydrocarbons. For example, crude oil, crude oil distillate, residual fuel, residual oil, biofuel or a synthetic oil product produced by a Fischer-Tropsch synthesis (i.e. oligomerization of carbon monoxide in the presence of hydrogen) and the materials which have undergone further processing step(s) after such synthesis, for example, distillation into distillate fractions and/or residual fractions, thermal cracking and/or catalytic cracking, solvent extraction, caustic treating, acid treating, dewaxing, and reforming, all fall within the definition of hydrocarbon composition even though these compositions can contain compounds comprising elements in addition to hydrogen and carbon.

The term "crude oil" denotes all types of mineral oils found in nature. Crude oil includes oils obtained from wells, shale, rock and/or sand among others.

The term "crude oil distillate" refers to any distillation overhead product, be it a fuel, oil, and/or some other product, obtained from the distillation (atmospheric or subatmospheric) of crude oil or refined crude oil. Crude oil distillates also include fuels, oils, or other products that have been obtained from the distillation of crude oil obtained by the thermal cracking and/or catalytic cracking of crude oil. Other processes which can be practiced on the crude oil during or prior to obtaining the crude oil distillate include solvent extraction, caustic treating, acid treating, dewaxing, desulfurizing, and reforming among other crude oil refining processes.

The term "residual oil" and "residual fuel" refers to any products, be it fuel or oil, at least partially composed of residual components, or residues, from the distillation (atmospheric or subatmospheric) of crude oil and/or refined crude oil. The terms "residual oil" and "residual fuel" also includes fuels, oils, and other products that have been obtained from the distillation of thermally and/or catalytically cracked crude oil. Other processes which can be practiced on the crude oil during or prior to obtaining the residual fuel or residual oil include solvent extraction, caustic treating, acid treating, dewaxing, desulfurizing, and reforming among other crude oil refining processes.

The term "biofuel" refers to a fuel that is derived from a biological source, such as a living cell, microbe, fungus, or plant. The term includes, for example, fuel directly obtained from a biological source, for example, by conventional extraction, distillation, or refining methods, and fuel produced by processing a biofuel precursor obtained from a biological source, for example by chemical modification, such as by transesterification procedures.

The term "alkyleneoxy" or "(AO)" refers to a divalent saturated aliphatic hydrocarbyl group bound to oxygen, where the saturated aliphatic hydrocarbyl group can have from 1 to 5 carbon atoms, such as from 1 to 3 carbon atoms, which can be either straight-chained or branched. Examples include, but are not limited to, ethyleneoxy (EO), propyleneoxy (PO) and butyleneoxy (BO).

The term "alkoxylated" as used herein means and refers to a compound having at least one alkyleneoxy (AO) unit.

The term "optional" or "optionally" means that the subsequently described event or circumstance may or may not occur, and that the description includes instances where said event or circumstance occurs and instances where it does not.

The present disclosure is generally directed to a pour point depressant composition comprising an alkoxylated alkyl amine polyester. Applicant has found the pour point depressant composition of the present disclosure to be a surprisingly effective wax crystal modifying additive in various compositions, in particular, in hydrocarbon compositions. Without being bound to any particular theory, it is thought that the degree of alkoxylation and nature of the aliphatic substituents in the ester and/or ether of the alkoxylated alkyl amine polyester provides the excellent improvement in pour point depression that can be obtained with these materials.

Thus, according to one embodiment, the present disclosure provides a pour point depressant composition comprising an alkoxylated alkyl amine polyester. In one embodiment, the alkoxylated alkyl amine polyester can be obtained from the reaction of a polycarboxylic acid and an alkoxylated alkyl amine.

In one embodiment, the polycarboxylic acid comprises a dicarboxylic acid. In such embodiments, the dicarboxylic acid can comprise an aliphatic dicarboxylic acid, alicyclic dicarboxylic acid or aromatic dicarboxylic acid. In one particular embodiment, the dicarboxylic acid includes, but is not limited to: sebacic acid derived from castor oil; a dimer acid derived from oleic acid, erucic acid or other acid; adipic acid; azelaic acid; malonic acid; 1,4-cyclohexanedicarboxylic acid; 4-methyl-1,2-cyclohexanedicarboxylic acid; n-dodecenyl acid; isododecenyl acid; n-dodecenylsuccinic acid; isododecenylsuccinic acid; glutaconic acid; fumaric acid; succinic acid; n-octenylsuccinic acid; n-octylsuccinic acid; dodecanedioic acid; maleic acid itaconic acid; citraconic acid; phthalic acid, terephthalic acid, isophthalic acid, orthophthalic acid; 1,5-naphthalenedicarboxylic acid; 2,6-naphthalenedicarboxylic acid; hydrogenated 2,6-naphthalenedicarboxylic acid; 4,4'-diphenyldicarboxylic acid; 2,2'-diphenyldicarboxylic acid; 4,4'-diphenyl ether dicarboxylic acid; an acid anhydride of any of these carboxylic acids; or mixtures thereof.

According to another embodiment, the polycarboxylic acid comprises a tricarboxylic acid or tetra-carboxylic acid. In one particular embodiment, the tricarboxylic or tetra-carboxylic acid includes, but is not limited to: 1,2,4-benzenetricarboxylic acid; 1,3,5-benzenetricarboxylic acid; 1,2,4-cyclohexanetricarboxylic acid; 2,5,7-naphthalenetricarboxylic acid; 1,2,4-naphthalenetricarboxylic acid; 1,2,4-butanetricarboxylic acid; pyromellitic acid; 1,2,5-hexanetricarboxylic acid; 1,3-dicarboxy-2-methyl-2-methylenecarboxypropane; tetra (methylenecarboxy)methane; 1,2,7,8-octanetetracarboxylic acid; empol trimer acid; an acid anhydride of any of these carboxylic acids; or mixtures thereof.

According to one particular embodiment, the carboxylic acid is a dicarboxylic acid having a formula

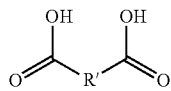

or a tricarboxylic acid having a formula

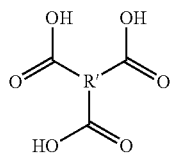

where R' is a straight-chained or branched $C_{18}$-$C_{54}$ alkyl group. In one embodiment, R' is a straight-chained or branched $C_{20}$-$C_{50}$ alkyl group, while in still another embodiment, R' is a straight-chained or branched $C_{24}$-$C_{44}$ alkyl group while in a further embodiment, R' is a straight-chained or branched $C_{30}$-$C_{40}$ alkyl group.

The polycarboxylic acid may be reacted with a variety of alkoxylated alkyl amines to produce the alkoxylated alkyl amine polyesters of the present disclosure. In one embodiment, the alkoxylated alkyl amine can have a general formula (1)

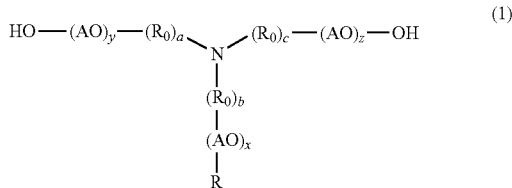

where R is a straight-chained or branched $C_1$-$C_{50}$ alkyl group, each $R_0$ is independently a straight-chained or branched $C_2$-$C_6$ alkyl group, each (AO) unit is independently an alkyleneoxy group, a is 0 or 1, b is 0 or 1, c is 0 or 1, x is an integer between 0 to 10, y is an integer between 0 to 10, z is an integer between 0 to 10 and y+z=1 to 20.

According to one particular embodiment, the alkoxylated alkyl amine is a compound of the formula (1) where each (AO) unit is independently ethyleneoxy, propyleneoxy or butyleneoxy. In another embodiment, the alkoxylated alkyl amine is a compound of the formula (1) where each (AO) unit is independently ethyleneoxy or propyleneoxy. In still yet another embodiment, the alkoxylated alkyl amine is a compound of the formula (1) where each (AO) unit is independently ethyleneoxy or propyleneoxy with the proviso that at least one (AO) unit is ethyleneoxy. In still another embodiment, the alkoxylated alkyl amine is a compound of the formula (1) where each (AO) unit is ethyleneoxy.

According to another embodiment, the alkoxylated alkyl amine is a compound of the formula (1) where each $R_0$ is independently a straight-chained or branched $C_2$-$C_5$ alkyl group or a straight-chained or branched $C_2$-$C_4$ alkyl group.

In still yet another embodiment, the alkoxylated alkyl amine is a compound of the formula (1) where y+z=1 to 16 or y+z=1 to 14 or y+z=1 to 12 or y+z=1 to 10. In another embodiment, the alkoxylated alkyl amine is a compound of the formula (1) where x is 0 or 1.

According to another embodiment, the alkoxylated alkyl amine is a compound of the formula (1) where R is a straight-chained or branched $C_4$-$C_{40}$ alkyl group or a straight-chained or branched $C_8$-$C_{36}$ alkyl group or a straight-chained or branched $C_{12}$-$C_{30}$ alkyl group.

According to one particular embodiment, the alkoxylated alkyl amine is a compound of the formula (1) where R is a straight-chained or branched $C_{12}$-$C_{30}$ alkyl group, each $R_0$ is independently a straight-chained or branched $C_2$-$C_4$ alkyl group, a is 0 or 1, b is 0 or 1, c is 0 or 1, each (AO) unit is independently ethyleneoxy or propyleneoxy, y+z=1 to 10 and x is an integer between 0 to 10 with the proviso that at least one (AO) unit is ethyleneoxy.

The alkoxylated alkyl amines may be produced by known methods, such as described in U.S. Pat. Nos. 6,060,625 and 8,034,979, the contents of which are herein incorporated by reference. For example, the alkoxylated alkyl amines can be prepared from the reaction of the corresponding alkyl amine/ alkyl ether amine with a selected number of moles of an alkylene oxide, optionally in the presence of a strong base, for example, an alkali metal hydroxide or an alkaline-earth metal hydroxide, a Brönsted acid or a Lewis acid, for example $AlCl_3$, $BF_3$ and the like.

In formula (1), the alkyleneoxy units can be arranged as desired. The structural units $[(AO)]_x$, $[(AO)]_y$ and $[(AO)]_z$ can thus be a homopolymer, random copolymer, a gradient copolymer, an alternating copolymer or a block copolymer made up of ethyleneoxy and/or other alkyleneoxy units. In accordance with one embodiment, the alkoxylated alkyl amine of formula (1) is ethoxylated, or has at least one ethyleneoxy unit. In a further embodiment, the alkoxylated alkyl amine is propoxylated, or has at least one propyleneoxy unit. In yet a further embodiment, the alkoxylated alkyl amine of formula (1) is ethoxylated and propoxylated and comprises a terminal ethyleneoxy unit.

The alkoxylated alkyl amine polyester may be produced from the reaction of the polycarboxylic acid and alkoxylated alkyl amine. Such reaction is not limited specifically, for example, the alkoxylated alkyl amine polyester resin may be produced by contacting the polycarboxylic acid and the alkoxylated alkyl amine, and carrying out esterification, transesterification, or polycondensation reactions.

When polymerizing the alkoxylated alkyl amine polyester, a polymerization catalyst may be used, for example, the catalyst can be titanium tetraalkoxide, titanium butoxide, titanium oxide, dibutyltin oxide, tin acetate, zinc acetate, tin disulfide, antimony trioxide germanium dioxide, magnesium acetate, and the like. The amount of polymerization catalyst may be appropriately adjusted considering various conditions, such as types of polycarboxylic acid and alkoxylated alkyl amine components that are to be used, temperature and reaction time.

The reaction temperature is not limited specifically, and can range from 180° C. to 280° C. When the reaction temperature is set at 180° C. or higher, productivity is expected to be enhanced, and at 280° C. or lower, decomposition of the alkoxylated alkyl amine polyester and the formation of odor-causing volatile by-products can be suppressed. The lower limit of the reaction temperature can, in some embodiments, be 200° C. or higher, especially 210° C. or higher, whereas the upper limit can, in some embodiments, be 270° C. or lower.

The time for carrying out the reaction may be appropriately set by considering various reaction conditions such as temperature, types of polycarboxylic acid and alkoxylated alkyl amine components to be used, type of polymerization catalyst to be used, and so forth. In some embodiments, the time for carrying out the reaction may be at least 1 hour, or at least 2 hours or at least 6 hours.

Thus, by way of example and without limitation, all reaction components can be charged to a vessel that is equipped with a stirrer, a thermometer and a reflux condenser and heated with stirring to a temperature from about 180° C. to about 280° C. for a period of about 0.5 hours to about 15 hours to carry out the reaction. A viscous solution of the alkoxylated alkyl amine polyester of the present disclosure is obtained as the product of the above-described process.

According to one particular embodiment, the alkoxylated alkyl amine polyester formed by the reaction can be represented by:

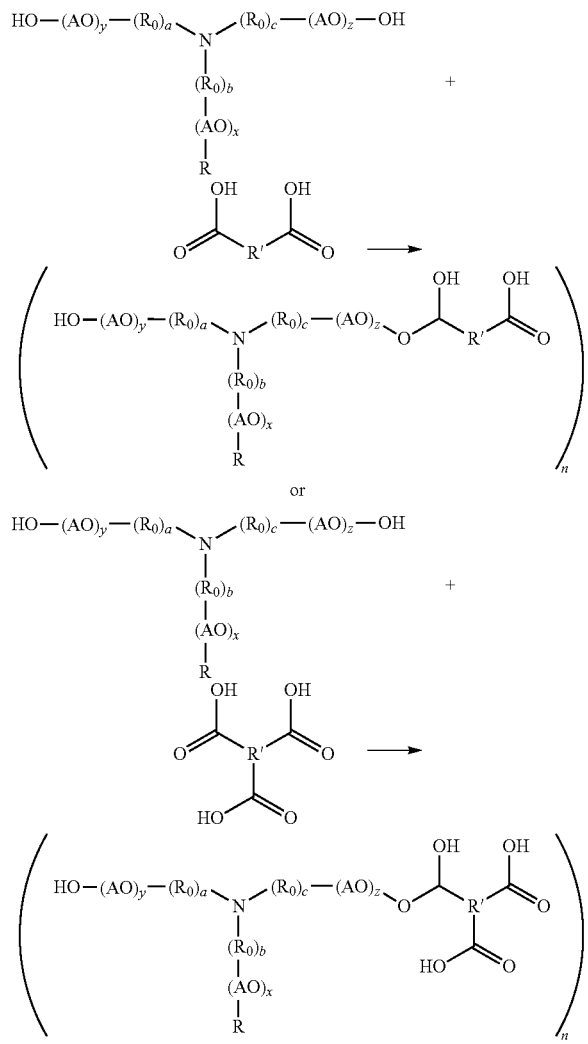

where R, $R_0$, R', (AO), a, b, c, x, y and z are defined above and n is an integer greater than 1, or in some embodiments greater than 10, or in other embodiments greater than 50, or in still other embodiments greater than 100.

According to one embodiment, the pour point depressant composition may further include an additional pour point depressant additive other than the alkoxylated alkyl amine polyester for improving low temperature flowability of the hydrocarbon composition, including but not limited to: an ethylene-unsaturated ester copolymer; a comb polymer; a polar nitrogen compound; a sulphur carboxy compound; a hydroxylated aromatic compound; or a mixture thereof. In one particular embodiment, the pour point depressant composition is substantially free of such an additional pour point depressant additive. By "substantially free" it is meant the pour point depressant composition contains less than 1% by weight, or less than 0.5% by weight, or less than 0.01% by weight or even less than 0.005% by weight, based on the total weight of the pour point depressant composition, of such an additional pour point depressant additive. In still another embodiment, the pour point depressant composition is completely free of an additional pour point depressant additive other than the alkyl amine alkoxylate polyester.

In another embodiment, the pour point depressant composition may include an auxilliary additive, including, but not limited to: a detergent; a particulate emission reducer; a stabilizing agent; biocide; colorant; an antioxidant; a corrosion inhibitor; an asphaltene inhibitor; a scale inhibitor; a conductivity improver; a sludge inhibitor; a dehazer; an emulsifier; an antifoaming agent; a cetane improver; a package compatibilizers; a lubricity additive; or a mixture thereof.

The auxilliary additives described above may be added to either the pour point depressant composition or any other concentrate or composition described herein. In one embodiment, the amount of auxilliary additives in any of the compositions or concentrates described herein can be about 1% by weight to about 10% by weight or about 1.5% by weight to about 9% by weight or about 2% by weight to about 8% by weight, all based on the total weight of the pour point depressant composition or any other concentrate or composition described herein.

In another embodiment, there is provided a pour point depressant concentrate comprising the pour point depressant composition of the present disclosure and a solvent.

In some embodiments, the pour point depressant concentrate can contain at least about 50% by weight of the pour point depressant composition or at least about 60% by weight of the pour point depressant composition or at least 70% by weight of the pour point depressant composition, based on the total weight of the pour point depressant concentrate. In another embodiment, the pour point depressant concentrate can contain less than 75% by weight of the pour point depressant composition or less than about 60% by weight of the pour point depressant composition or less than about 50% of the pour point depressant composition or even less than about 30% by weight of the pour point depressant composition, based on the total weight of the pour point depressant concentrate. In still another embodiment, the pour point depressant concentrate can contain between about 20% by weight to about 80% by weight of the pour point depressant composition or between about 30% by weight to about 70% by weight of the pour point depressant composition or even between about 40% by weight to about 55% by weight of the pour point depressant composition, based on the total weight of the pour point depressant concentrate.

In one embodiment, the solvent can be a hydrocarbon, alcohol, ether, nitrile, mineral spirit or a mixture thereof.

In one particular embodiment, the solvent comprises a hydrocarbon. The hydrocarbon may, for example, comprise an acyclic, cyclic, saturated, unsaturated alkane, arene or alkylarene hydrocarbon. Examples include, but are not limited to, pentane, pentene, hexane, hexene, petroleum ethers, cyclohexane, benzene, toluene, xylene, gasoline, kerosene, diesel oil, heater oil, heavy aromatic naptha, naphthalene, n-undecane, n-dodecane, mixtures of paraffinic hydrocarbons, mixtures of paraffinic and naphthenic hydrocarbons, mixtures of iso-paraffins or any mixture thereof.

In another particular embodiment, the solvent comprises an alcohol. The alcohol may be a mono- or polyhydric alcohol, including, but not limited to, methanol, ethanol, n-propanol, i-propanol, n-butanol, sec-butanol, i-butanol, tert-butanol, a glycol such as ethylene glycol, propylene glycol, dipropylene glycol, glycerol, a polyalkylene glycol such as polyethylene glycol or mixtures thereof.

In some embodiments, the pour point depressant concentrate can contain at least about 10% by weight of the solvent, or at least about 20% by weight of the solvent or at least about 30% by weight of solvent or at least about 40% by weight or solvent or even at least about 50% by weight of solvent, based on the total weight of the pour point depressant concentrate In other embodiments, the pour point depressant concentrate can contain less than about 80% by weight of the solvent, or less than about 60% by weight of the solvent or less than about 50% by weight of solvent or less than about 40% by weight or solvent or even less than about 30% by weight of solvent, based on the total weight of the pour point depressant concentrate. In further embodiments, the pour point depressant concentrate can contain between about 10% by weight to about 50% by weight of the solvent, or between about 15% by weight to about 45% by weight of solvent, or even between about 20% by weight to about 40% by weight of solvent, based on the total weight of the pour point depressant concentrate.

According to another embodiment, the pour point depressant composition or concentrate of the present disclosure can be used to prevent paraffin wax formation by depressing the pour point of a hydrocarbon composition. The pour point of a fluid may be defined as the temperature at which the fluid sample is no longer considered to flow when subjected to the standardized schedule of quiescent cooling prescribed by ASTM D97 or ASTM D5853.

Thus, according to one embodiment, the present disclosure provides a composition comprising a hydrocarbon composition and the pour point depressant composition of the present disclosure. In another embodiment, the present disclosure provides a composition comprising a hydrocarbon composition and the pour point depressant concentrate of the present disclosure. It has been surprisingly found that such compositions can have a pour point lower than the pour point of the composition comprising the hydrocarbon composition alone.

In some embodiments, the hydrocarbon composition can have a boiling point greater than about 80° C. or greater than about 100° C. or alternatively greater than about 120° C. In other embodiments, the hydrocarbon composition can boil within a range of about 80° C. to about 400° C. or alternatively between about 100° C. to about 370° C. In still other embodiments, the hydrocarbon composition can have a boiling point greater than about 300° C. or alternatively greater than about 330° C. or alternatively greater than about 360° C. In yet other embodiments, the hydrocarbon composition can boil within a range of about 300° C. to about 600° C. or alternatively within the range of about 340° C. to about 560° C. The boiling point information presented herein is provided as atmospheric pressure boiling points. While the boiling points are stated as an atmospheric boiling point, the hydrocarbon composition can be produced using any distillation pressure be it atmospheric pressure, subatmospheric pressure, or superatmospheric pressure. One skilled in the art can readily convert subatmospheric or superatmospheric pressure boiling point temperatures to atmospheric boiling point temperatures.

In an embodiment, the hydrocarbon composition can have a pour point greater than about −30° C. In some embodiments, the hydrocarbon composition can have a pour point greater than about −15° C. or alternatively greater than about 0° C. or alternatively greater than about 15° C. or alternatively greater than about 30° C. In other embodiments, the hydrocarbon composition can have a pour point ranging between about −30° C. and 70° C. or alternatively between about −15° C. and 60° C. or alternatively between about 0° C. and about 45° C.

In still another embodiment, the hydrocarbon composition can comprise waxy constituents which can precipitate from the hydrocarbon composition at a temperature greater than its desired and/or intended storage, transport, and/or use temperature. In some embodiments, the hydrocarbon composition can have a wax content greater than about 1% by weight, based on the total weight of the hydrocarbon composition. In other embodiments, the hydrocarbon composition can have a wax content greater than about 2% by weight or alternatively greater than about 3% by weight or alternatively greater than about 5% by weight or alternatively, greater than about 7.5% by weight, based on the total weight of the hydrocarbon composition. In an embodiment, the hydrocarbon composition comprises waxy constituents which form wax precipitate particles having an average wax particle size greater than about 50 microns.

In another embodiment, the hydrocarbon composition generally has a pour point higher than the transport, storage, and/or use temperature of the hydrocarbon composition. Thus, one function of the pour point depressant composition or concentrate can be to decrease the pour point of the hydrocarbon composition such that the composition comprising the hydrocarbon composition and the pour point depressant composition or concentrate can have a pour point lower than the pour point of the hydrocarbon composition alone (a depressed pour point).

In another embodiment, the hydrocarbon composition can form wax precipitate particles at a temperature higher than the transport, storage, and/or use temperature of the hydrocarbon composition. Thus, another function of the pour point depressant composition or concentrate can be to reduce the average wax particle size in the hydrocarbon composition such that the composition comprising the hydrocarbon composition and the pour point depressant composition or concentrate has an average wax particle size smaller than the hydrocarbon composition alone at its transport, storage, and/or use temperature.

Generally, the composition comprising the hydrocarbon composition and the pour point depressant composition or concentrate comprises a sufficient concentration of alkoxylated alkyl amine polyester to decrease the pour point of the composition and/or reduce the average wax particle size in the composition to a sufficient point to allow its storage, transport and/or use at the desired conditions.

In an embodiment, the concentration of the alkoxylated alkyl amine polyester within the composition can range from about 0.0005% by weight to about 2.0% by weight, based on the total weight of the composition. In other embodiments, the concentration of the alkoxylated alkyl amine polyester within the composition can range from about 0.001% by weight to about 1.0% by weight or alternatively from about 0.001% by weight to about 0.5% by weight or alternatively from about 0.005% by weight to about 0.25% by weight, based on the total weight of the composition. In still another embodiment, the pour point depressant composition or concentrate may be added to the composition such that the alkoxylated alkyl amine polyester is present in the composition at a concentration of at least 50 ppm, based on the total weight of the composition, or in some embodiments, at a concentration of from about 50 ppm to about 5000 ppm, based on the total weight of the composition, in still other embodiments at a concentration of from about 250 ppm to about 1000 ppm, based on the total weight of the composition. In an embodiment, the presence of the pour point depressant composition or concentration in the composition comprising the hydrocarbon composition can depress the composition's pour point by at least about 0.5° C., or by at least about 1° C. or by at least about 3° C. or by at least about 5° C. or by at least about 7.5° C. or alternatively by at least about 10° C.

In an embodiment, the composition comprising the hydrocarbon composition and the pour point depressant composition or concentrate comprises wax precipitate particles having an average wax particle size of less than about 50 microns. In some embodiments, the composition comprising the hydrocarbon composition and the pour point depressant composition or concentrate comprises wax precipitate particles having an average wax particle size ranging from about 20 microns to about 50 microns. In still other embodiments, the composition comprising the hydrocarbon composition and the pour point depressant composition or concentrate comprises wax precipitate particles having an average wax particle size of less than about 20 microns.

In addition to the hydrocarbon composition and the pour point depressant composition or concentrate, the composition can further contain other added auxilliary materials. Often these additional auxilliary materials are added to improve the transport, storage, and/or use properties of the composition. For example, the auxilliary materials commonly added to the composition to improve its transport, storage, or use properties can include those auxilliary additives described above, such as antioxidants, corrosion or rust inhibitors, haze inhibitors, foam inhibitors, dispersants, emulsifying agents, detergents, viscosity index improvers, extreme pressure agents, dyes, and/or dye stabilizers.

In another embodiment, the present disclosure provides a method of decreasing a pour point of a hydrocarbon composition comprising combining the hydrocarbon composition and the pour point depressant composition or concentrate of the present disclosure. In still another embodiment, the present disclosure provides a method of decreasing the average wax particle size in a hydrocarbon composition comprising combining the hydrocarbon composition and the pour point depressant composition or concentrate of the present disclosure. In still yet another embodiment, the present disclosure provides a method of decreasing the pour point of a hydrocarbon composition and decreasing the average wax particle size in a hydrocarbon composition comprising combining the hydrocarbon composition and the pour point depressant composition or concentrate of the present disclosure.

The hydrocarbon composition and pour point depressant composition or concentrate are described herein and their embodiments are generally applicable to the method of decreasing the pour point of a hydrocarbon composition and/or decreasing the average wax particle size in a hydrocarbon composition. The hydrocarbon composition and pour point depressant composition or concentrate are typically combined in any quantity sufficient to decrease the pour point of the hydrocarbon composition and/or decrease the average wax particle size in the hydrocarbon composition to a sufficient extent to allow its storage, transport and/or use at the desired conditions. The quantity of alkoxylated alkyl amine polyester, the reduction in the pour point, and the average wax particle size are described herein and are generally applicable to the method of decreasing the pour point of a hydrocarbon composition and/or decreasing the average wax particle size in a hydrocarbon composition.

EXAMPLES

Example 1: Synthesis by Reacting Tallow Amine Ethoxylate (SURFONIC® T-2 Surfactant) with Dimer Acid Procedure: 285 grams dimer acid, 179 grams of SURFONIC® T-2 surfactant and 2.35 grams of titanium butoxide were charged into a 1000 ml 3-neck flask. The flask was heated to 210° C. with agitation and water was removed during the reaction. After 12 hours, the reaction was stopped. The alkoxylated alkyl amine polyester that was obtained was a viscous liquid and is referred to as PPD-1.

Example 2: Synthesis by Reacting Tallow Amine Ethoxylate (SURFONIC® T-2 Surfactant) with Adipic Acid Procedure: 73 grams of adipic acid, 179 grams of SURFONIC® T-2 surfactant and 1.25 grams of titanium butoxide were charged into a 500 ml 3-neck flask. The flask was heated to 210° C. with agitation and water was removed during the reaction. After 12 hours, the reaction was stopped. The alkoxylated alkyl amine polyester that was obtained was a viscous liquid and is referred to as PPD-2.

Example 3: Synthesis by Reacting Tallow Amine Ethoxylate (SURFONIC® T-5 Surfactant) with Dimer Acid Procedure: 285 grams dimer acid, 245 grams of SURFONIC® T-5 surfactant and 2.35 grams of titanium butoxide were charged into a 1000 ml 3-neck flask. The flask was heated to 210° C. with agitation and water was removed during the reaction. After 12 hours, the reaction was stopped. The alkoxylated alkyl amine polyester that was obtained was a viscous liquid and is referred to as PPD-3.

Example 4: Evaluation of the PPD's as Pour Point Depressants According to Standard Test Method ASTM D97

Procedure: A local commercial diesel was treated by silica to remove the polar additives and then further distilled to remove polymeric additives. The treated diesel was then used as a base to evaluate the performance of the PPDs obtained in the above examples. The results are summarized below in Table 1:

TABLE 1

| Sample | PPD concentration (ppm) | Pour point ° C. |
|---|---|---|
| Base | 0 | −15 |
| Base + PPD-1 | 500 | −33 |
| Base + PPD-1 | 100 | −18 |
| Base + PPD-2 | 500 | −27 |
| Base + PPD-2 | 100 | −15 |
| Base + PPD-3 | 500 | −30 |
| Base + PPD-3 | 100 | −18 |

While the foregoing is directed to embodiments of the present disclosure, other and further embodiments of the disclosure may be devised without departing from the basic scope thereof, and the scope thereof is determined by the claims that follow.

The invention claimed is:

1. A pour point depressant composition comprising an alkoxylated alkyl amine polyester obtained from the reaction of a polycarboxylic acid and an alkoxylated alkyl amine wherein the polycarboxylic acid comprises n-dodecenyl acid, isododecenyl acid, n-dodecenylsuccinic acid, isododecenylsuccinic acid, n-octenylsuccinic acid, n-octylsuccinic acid, dodecanedioic acid, 1,5-naphthalenedicarboxylic acid, 2,6-naphthalenedicarboxylic acid, hydrogenated 2,6-naphthalenedicarboxylic acid, 4,4'-diphenyldicarboxylic acid, 2,2'-diphenyldicarboxylic acid, 4,4'-diphenyl ether dicarboxylic acid, 1,3,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, pyromellitic acid, 1,2,5-hexanetricarboxylic acid, 1,3-dicarboxy-2-methyl-2-methylenecarboxypropane, tetra(methylenecarboxy)methane, 1,2,7,8-octanetetracarboxylic acid, empol trimer acid, a dicarboxylic acid having a formula

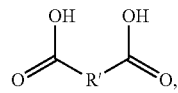

a tricarboxylic acid having a formula

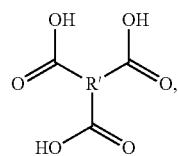

wherein R' is a straight-chained or branched $C_{18}$-$C_{54}$ alkyl group, an acid anhydride of any of these polycarboxylic acids or a mixture thereof.

2. The pour point depressant composition of claim 1, wherein the alkoxylated alkyl amine is a compound having the formula

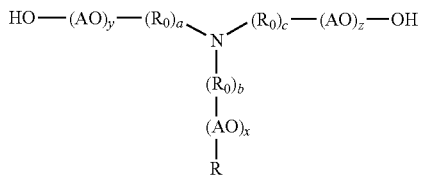

wherein R is a straight-chained or branched $C_1$-$C_{50}$alkyl group, each $R_0$ is independently a straight-chained or branched $C_2$-$C_6$ alkyl group, each (AO) unit is independently an alkyleneoxy group, a is 0 or 1, b is 0 or 1, c is 0 or 1, x is an integer between 0 to 10, y is an integer between 0 to 10, z is an integer between 0 to 10 and y+z=1 to 20.

3. The pour point depressant composition of claim 2, wherein each (AO) unit is independently ethyleneoxy or propyleneoxy with the proviso that at least one (AO) unit is ethyleneoxy.

4. The pour point dispersant composition of claim 2, wherein R is a straight-chained or branched $C_{12}$-$C_{30}$ alkyl group.

5. The pour point depressant composition of claim 2, wherein x is 0 or 1.

6. The pour point depressant composition of claim 2, wherein y+z=1 to 10.

7. The pour point depressant composition of claim 1, wherein the pour point depressant composition is substantially free of an additional pour point depressant additive.

8. The pour point depressant composition of claim 1, wherein the alkoxylated alkyl amine polyester is a compound having the formula

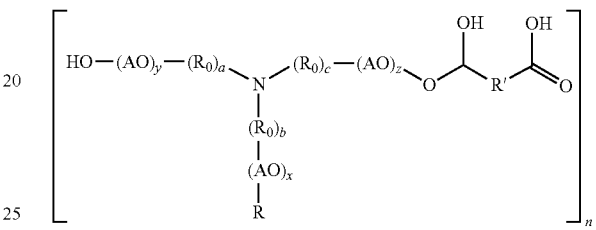

wherein R is a straight-chained or branched $C_{12}$-$C_{30}$ alkyl group, R' is a is a straight-chained or branched $C_{18}$-$C_{54}$ alkyl group, each $R_0$ is independently a straight-chained or branched $C_2$-$C_5$ alkyl group, at least one (AO) unit is ethyleneoxy, a is 0 or 1, b is 0 or 1, c is 0 or 1, x is an integer between 0 to 10, y is an integer between 0 to 10, z is an integer between 0 to 10, y+z=1 to 20 and n is an integer greater than 1.

9. A pour point depressant concentrate comprising the pour point depressant composition of claim 1 and a solvent.

10. The pour point depressant concentrate of claim 9, wherein the solvent comprises an alcohol.

11. A composition comprising a hydrocarbon composition and the pour point depressant composition of claim 1.

12. The composition of claim 11, wherein the concentration of the alkoxylated alkyl amine polyester in the composition ranges from about 0.0005% by weight to about 2.0% by weight, based on the total weight of the composition.

13. The composition of claim 11, wherein the pour point of the composition is depressed by at least about 1° C.

14. A method of forming a pour point depressant composition comprising reacting a polycarboxylic acid and an alkoxylated alkyl amine at a temperature of 180° C. to 280° C. wherein the polycarboxylic acid comprises n-dodecenyl acid, isododecenyl acid, n-dodecenylsuccinic acid, isododecenylsuccinic acid, n-octenylsuccinic acid, n-octylsuccinic acid, dodecanedioic acid, 1,5-naphthalenedicarboxylic acid, 2,6-naphthalenedicarboxylic acid, hydrogenated 2,6-naphthalenedicarboxylic acid, 4,4'-diphenyldicarboxylic acid, 2,2'-diphenyldicarboxylic acid, 4,4'-diphenyl ether dicarboxylic acid, 1,3,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, pyromellitic acid, 1,2,5-hexanetricarboxylic acid, 1,3-dicarboxy-2-methyl-2-methylenecarboxypropane, tetra(methylenecarboxy)methane, 1,2,7,8-octanetetracarboxylic acid, empol trimer acid, a dicarboxylic acid having a formula

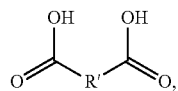

a tricarboxylic acid having a formula

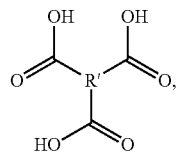

wherein R' is a straight-chained or branched $C_{18}$-$C_{54}$ alkyl group, an acid anhydride of any of these polycarboxylic acids or a mixture thereof.

15. A method of decreasing a pour point and/or average wax particle size of a hydrocarbon composition comprising combining the hydrocarbon composition and the pour point depressant composition of claim 1.

* * * * *